United States Patent
Lewis et al.

(10) Patent No.: US 8,762,153 B2
(45) Date of Patent: Jun. 24, 2014

(54) SYSTEM AND METHOD FOR IMPROVING NAME DIALER PERFORMANCE

(75) Inventors: Steven Hart Lewis, Middletown, NJ (US); Michael T. Czahor, III, Bethlehem, PA (US); Ramkishore Dudi, Dayton, NJ (US); Susan Helen Pearsall, Oakhurst, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1294 days.

(21) Appl. No.: 12/209,776

(22) Filed: Sep. 12, 2008

(65) Prior Publication Data

US 2010/0042414 A1 Feb. 18, 2010

Related U.S. Application Data

(60) Provisional application No. 61/089,700, filed on Aug. 18, 2008.

(51) Int. Cl.
*G10L 21/00* (2013.01)
(52) U.S. Cl.
USPC .......................... 704/270.1; 704/231; 704/257
(58) Field of Classification Search
CPC .................................. G01L 15/30; H04M 1/64
USPC .................... 704/270.1, 257, 270; 379/88.03
See application file for complete search history.

(56) References Cited

U.S. PATENT DOCUMENTS

| | | | |
|---|---|---|---|
| 6,421,672 B1 * | 7/2002 | McAllister et al. .................... 1/1 |
| 7,299,181 B2 * | 11/2007 | Ju et al. .......................... 704/257 |
| 7,769,592 B2 * | 8/2010 | Kemble et al. ................. 704/275 |
| 2002/0120452 A1 * | 8/2002 | Davis et al. .................... 704/270 |
| 2002/0196911 A1 * | 12/2002 | Gao et al. .................... 379/88.03 |
| 2006/0241944 A1 * | 10/2006 | Potter et al. ................... 704/254 |
| 2007/0143100 A1 * | 6/2007 | Agapi et al. ....................... 704/9 |
| 2008/0059172 A1 * | 3/2008 | Bocking ........................ 704/235 |
| 2008/0187121 A1 * | 8/2008 | Agarwal et al. ........... 379/218.01 |
| 2010/0042414 A1 * | 2/2010 | Lewis et al. ................ 704/270.1 |

\* cited by examiner

*Primary Examiner* — Vincent P Harper

(57) ABSTRACT

Disclosed herein are systems, methods, and computer readable-media for improving name dialer performance. The method includes receiving a speech query for a name in a directory of names, retrieving matches to the query, if the matches are uniquely spelled homophones or near-homophones, identifying information that is unique to all retrieved matches, and presenting a spoken disambiguation statement to a user that incorporates the identified unique information. Identifying information can include multiple pieces of unique information if necessary to completely disambiguate the matches. A hierarchy can establish priority of multiple pieces of unique information for use in the spoken disambiguation statement.

20 Claims, 2 Drawing Sheets

SYSTEM AND METHOD FOR IMPROVING NAME DIALER PERFORMANCE

CROSS-REFERENCE TO RELATED APPLICATIONS

This application claims the benefit of provisional patent application No. 61/089,700, filed Aug. 18, 2008, the contents of which is incorporated herein by reference in its entirety.

BACKGROUND OF THE INVENTION

1. Field of the Invention

The present invention relates to name dialers and more specifically to disambiguating homophone results in a name dialer.

2. Introduction

Many governmental, business, and nonprofit organizations use automated speech recognition (ASR) in phone directories of employee names to replace the traditional large-business switchboard. Instead of asking an operator to connect the call, such phone directories prompt a caller to say the name of the person they are trying to contact. An ASR system converts the speech to text. The phone directory locates the n-best matches to the uttered name. If only one match is found, the phone directory either connects the caller immediately or requests an explicit or implicit confirmation that the found match is the same person the caller wanted to contact. If more than one match is found, conventional systems check if the names are spelled exactly the same because that is a computationally simple check. If the matching names are spelled the same, then a phone directory provides some sort of disambiguation prompt, such as "Do you mean Eric Clark in Florida or Eric Clark in Montana?"

However, this approach can lead to some confusing situations where two names are spelled differently but sound the same. For example, Eric Clark and Erik Clarke are spelled differently, but pronounced the same. A check for matching spelling would not catch these two names. A traditional name dialing system would prompt a user "Do you want Eric Clark or Erik Clarke?" Because communications are spoken, not in writing, and because the names sound exactly the same, the caller is likely to become confused and frustrated, not knowing which of the presented names is correct. Further, the name dialing system appears to be broken or unintelligent because the names are the same from the caller's point of view.

Accordingly, what is needed in the art is an improved way of providing disambiguation in name dialers.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods, and tangible computer readable-media for improving name dialer performance. The method includes receiving a speech query for a name in a directory of names, retrieving matches to the query, if the matches are uniquely spelled homophones or near-homophones, identifying information that is unique to all retrieved matches, and presenting a spoken disambiguation statement to a user that incorporates the identified unique information. Identifying information can include multiple pieces of unique information if necessary to completely disambiguate the matches. A hierarchy can establish priority of multiple pieces of unique information for use in the spoken disambiguation statement.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
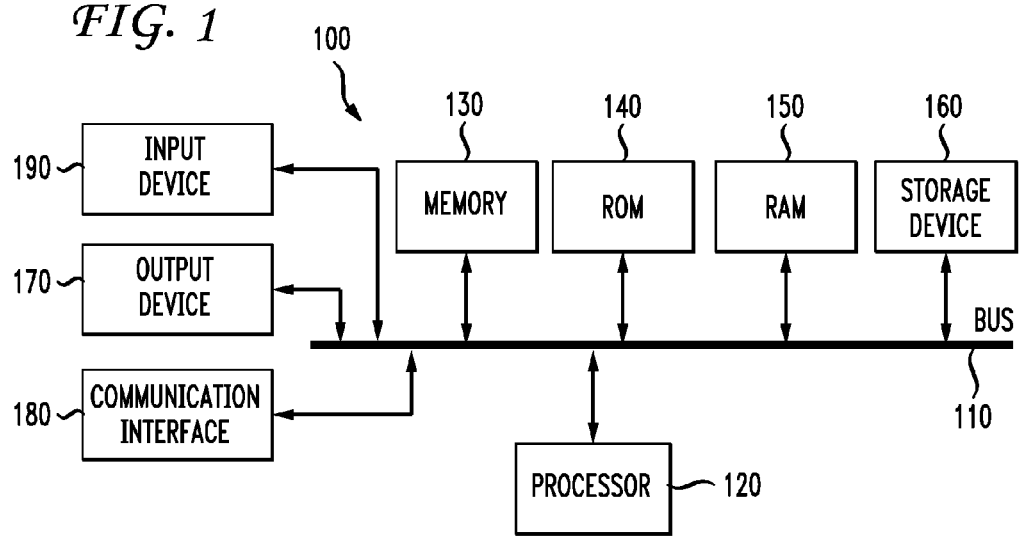
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software. Particular functionality may also be built into the design of a separate computer chip. An STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
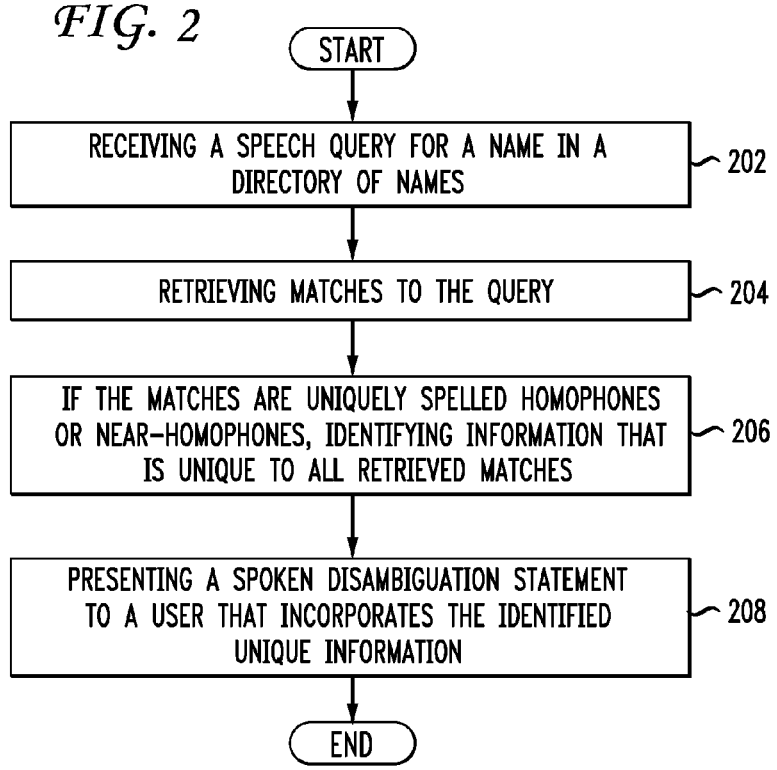
FIG. 2 illustrates an example method embodiment.

Having disclosed basic system concepts, the disclosure turns to FIG. 2, which illustrates an example method embodiment. First, the method includes receiving a speech query for a name in a directory of names (202). This is typically performed in the context of a person placing a telephone call to a speech-enabled directory of an organization. For example, a large corporation like AT&T may have a single 1-800 number as a point of contact for all of its sales offices nationwide, a single 1-800 number for all public relations business, etc. Each phone number, in addition to the purpose-specific design, can include functionality to allow callers to access a directory of employees by name. A caller speaks the name of the person the caller desires to contact. The speech may or may not be converted to text, but is somehow compared to names in the directory. One variation which does not require conversion to text is to build a grammar based on a direct comparison of the waveforms. Other variations exist to compare speech to names in a directory which may be readily employed by one of skill in the art.

Next the method includes retrieving matches to the query (204). Often, only one match will be found, as in the case of an unusual first and/or last name or in the case of a small directory of names. In these cases, the principles described herein do not apply. Matches are found when comparing the spoken query to the directory of names. Typically the retrieved names will frequently sound similar because a matching algorithm will try to find the most probable matches.

Next the method includes identifying information that is unique to all retrieved matches if the matches are uniquely spelled homophones or near-homophones (206). When matching names are spelled differently but pronounced the same or similarly, one of the main problems addressed by this disclosure arises. For example, suppose a caller makes a speech query for "Marc Clark," and the directory of names and the associated grammar built from it contains both "Marc Clark" and "Mark Clarke." Since these two names are pronounced the same, a grammar trained on the directory of names will return both. A traditional computer-based match dependent on exact spelling will not recognize that "Marc Clark" and "Mark Clarke" are pronounced the same. A homophone identification process will know these are homophones, and shift the dialog to follow a disambiguation path in the application relying on other identifying information, such as, the person's city, state, department in the organization, title, etc. A threshold can be used to determine near-homophones. A threshold can be dynamic, static, empirical, changeable only by administrators, based on feedback from users, etc.

Such identifying information can be customized for the disambiguation needs of a particular organization. For example, if two workers named Brian Smith work in the same office, one having blonde hair and one having red hair, the system can be modified to identify them as "Blond Brian" and "Red-Head Brian".

While names that sound the same or are confusable are more frequent the larger an organization becomes, there is always a chance that one particular piece of information about both is insufficient to allow a caller to ascertain which is which. For example, two people with the same name can work in the same office. In that case, identification by city is ineffective and identification by office location is ineffective. Multiple individual pieces of information may need to be combined to completely disambiguate the matches. For example, the system may need to include a combination of information regarding job title, specialty, and city to sufficiently disambiguate one name in the directory from another.

Even with multiple pieces of information, a caller may still be unsure which name is the correct one. In these cases, the user asks for further disambiguation information, which a name dialing system responds to by presenting further spoken disambiguation information to the user. A hierarchy can establish priority of multiple pieces of unique information for use in the spoken disambiguation statement. Such a hierarchy can establish that the first preferred disambiguation information is the city. If the city does not sufficiently disambiguate, then the next piece of information is job title, and so on. The hierarchy can be dynamic or static. A static hierarchy attempts to provide disambiguation information a fixed order, i.e. the state first, the city second, the position in the company third, etc. A dynamic hierarchy analyzes the matches and any associated information to determine disambiguation information based on which has the highest degree of difference or the greatest strength of difference. For example, if two matching names both live in California, then asking "Did you mean Robbie Johnsen in Cupertino or Robby Johnson in Sunnyvale" is not a strong disambiguation. If their occupations are the most dissimilar commonly known information, then that information can be used to disambiguate based on a dynamic hierarchy. In that case, asking "Did you mean Robbie Johnsen in accounting or Robby Johnson the sanitation engineer" is a strong disambiguation. A dynamic hierarchy for disambiguation can be based, at least in part, on the caller and what information the caller is likely to know.

In one variation, the same principles apply to directories containing only first names such as a phone directory of a smaller organization. Ambiguity between homophones can occur even when dealing with first names.

Lastly, the method includes presenting a spoken disambiguation statement to a user that incorporates the identified unique information (208). The method can further include the steps of receiving a confirmation of one of the matches and connecting a caller to the confirmed match. For example, a sample prompt in a name dialing system can say "Press 1 for Jack Johnson or press 2 for Jack Johnston". The confirmation of the match is the action of the user pressing 1 or 2. The confirmation can be pressing a button, saying a word or phrase, etc. Confirmation can be explicit or implicit. This method of dealing with cases of multiple matches, improves both the accuracy of name dialing as well as callers' perceptions of the accuracy and intelligence of the name dialing application.

Figure 3:
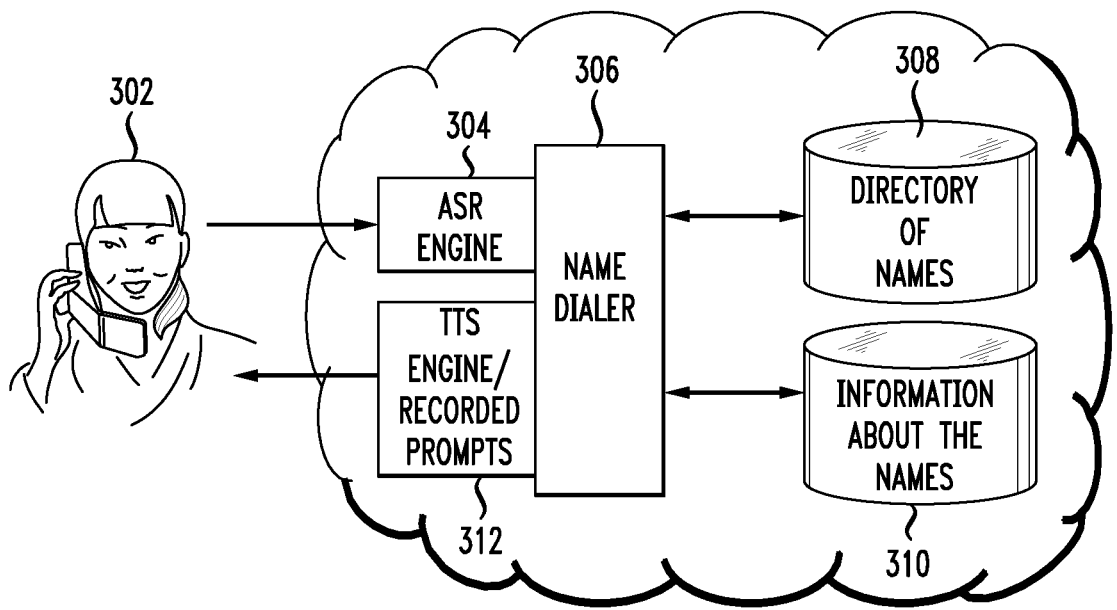
FIG. 3 illustrates an example name dialing system.

FIG. 3 illustrates an example name dialing system. An organization or company can establish a name dialing system 300 to allow callers 302 to use speech commands to search for and connect to specific individuals or employees in the organization. The name dialing system can be made up of one server or a cluster of servers working in concert. A caller 302 calls the system using technology like POTS, cellular phones, Voice over IP phone, or even some sort of in-person speech interaction terminal such as at a kiosk, etc. The system employs an ASR engine 304 to recognize incoming speech from a caller 302. The ASR engine interfaces with a name dialer 306. The name dialer takes a spoken name as input and searches a directory of names 308 for potential matches. If the name dialer finds more than a single match, or n-best results, a separate module can check if the matches are spelled the same way. If they are spelled the same way or if only one match is returned, the following principles are not needed and conventional approaches known in the art can be applied.

If, on the other hand, two or more matches are returned which are not spelled the same and which are determined to be homophones or near homophones, the name dialer retrieves additional information about the names 310. Additional information is analyzed to determine which pieces of information are unique to all the matched names, and therefore capable of aiding in disambiguation. The information database 310 and the directory of names 308 can be separate databases as shown or they can be completely or partially integrated. The information database 310 can contain information for each entry in the directory of names and can contain varying types of data. For example, the information database can store an associated job title, work city, office number, and even personal attributes like tall, bald, etc. for each name. A database such as this can be centrally maintained. Users can be allowed to log in to the database and alter information about themselves.

Once the name dialer 306 has matching names and information about those matching names, the name dialer assembles a spoken disambiguation statement that incorporates unique information to the output to the caller 302 through a text-to-speech engine or a series of recorded prompts 312. In one example, the system says "Press 1 for Scott Todd, CFO; press 2 for Scot Ott, Janitor. Press 3 for additional information about each." At this point, a user can either select one of the options or request further information if he or she is still unsure. Pressing 1 or 2 will connect to the phone number associated with the identified name. Pressing 3 will result in a prompt like "Press 1 for Scott Todd, CFO in the Miami Beach office; press 2 for Scot Ott, Janitor in the Tallahassee office." The information provided can be dynamically selected based on the level of difference in the information and/or the likelihood that the information provided would assist a caller in uniquely identifying the desired party. The selection of additional information can be based at least in part on the caller's relationship (or lack thereof) with the matching names.

The principles described herein, it should be noted, operate optimally at the application layer, not on the ASR grammar. Other implementations using the same ideas as described above can work in a similar fashion even while they may be architecturally different.

The principles described herein can be applied to computer-based searches where possible search results include homophones or near homophones. An Internet search can be text entered into a field on a web page and relayed to a search engine. The prior art and current practice in the field suggests names (or other words) for mistyped search terms. Homophones and near homophones are not considered. The principles described herein can be applied when a search engine converts the text to phonemes and checks for or suggests homophones or near-homophones. For example, if a user enters search text for "Erica Louis" in Google or Yahoo!, the text can be converted to a phoneme representation and compared to other terms. Exact spelling or a commonly misspelled word is not a requirement in such a case. Homophony or near homophony is the key that links a search term to search results or to suggested terms or results. A search engine can return results for the exact spelling "Erica Louis" but can also ask the user "Did you mean 'Arica Lewis'?" Disambiguation can be provided as well, such as "Did you mean 'Arica Lewis' the C.E.O. of Butterworth Industries?" Multiple variations of this idea exist and can be applied to Internet-based search engines.

Name dialers are classically associated with phone directories of names of persons. City names, place names, business names, etc. can all be the subject of a name dialer as well. The invention, while likely to be implemented primarily in the domain of personal names, is not limited to personal names. Any set of names or words which can sound the same but can be spelled differently can be used.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be applied to any provider who uses ASR names directories or dialers or to any search, spoken or text, where homophones or near-homophones are possible. Those skilled in the art will readily recognize various modifications and changes that may be made to the present invention without following the example embodiments and applications illustrated and described herein, and without departing from the true spirit and scope of the present invention.

We claim:

1. A method comprising:
receiving a speech query for a name in a directory of names;
retrieving matches to the query, the matches comprising a first match and a second match that are one of homophonic and near-homophonic;
identifying first meta-data that is unique to and associated with the first match and second meta-data that is unique to and associated with the second match;
identifying, via an analysis of the first meta-data and the second meta-data, a first meta-data component of the first meta-data and a second meta-data component of the second meta-data, wherein the first meta-data component and the second meta-data component have a highest strength of difference between the first meta-data and the second meta-data; and
presenting a spoken disambiguation statement to a user that incorporates the first meta-data component and the second meta-data component.

2. The method of claim 1, wherein identifying of the first meta-data and the second meta-data comprises identifying multiple pieces of unique information when necessary to completely disambiguate the matches.

3. The method of claim 2, wherein a hierarchy establishes priority of multiple pieces of the first meta-data and the second meta-data for use in the spoken disambiguation statement.

4. The method of claim 1, wherein a threshold is used to determine near-homophones.

5. The method of claim 1, the method further comprising:
receiving a confirmation of one of the matches, to yield a confirmed match; and
connecting a caller to the confirmed match.

6. The method of claim 1, wherein the first meta-data and the second meta-data are customized.

7. The method of claim 1, the method further comprising:
receiving a request from a user for further disambiguation information; and
presenting the further spoken disambiguation information to the user.

8. A system comprising:
a processor; and
a computer-readable storage medium having instructions stored which, when executed by the processor, cause the processor to perform operations comprising:
receiving a speech query for a name in a directory of names;
retrieving matches to the query, the matches comprising a first match and a second match that are one of homophonic and near-homophonic;
identifying first meta-data that is unique to and associated with the first match and second meta-data that is unique to and associated with the second match; and
identifying, via an analysis of the first meta-data and the second meta-data, a first meta-data component of the first meta-data and a second meta-data component of the second meta-data, wherein the first meta-data component and the second meta-data component have a highest strength of difference between the first meta-data and the second meta-data; and
presenting a spoken disambiguation statement to a user that incorporates the first meta-data component and the second meta-data component.

9. The system of claim 8, wherein identifying of the first meta-data and the second meta-data comprises identifying multiple pieces of unique information when necessary to completely disambiguate the matches.

10. The system of claim 9, wherein a hierarchy establishes priority of multiple pieces of the unique information for use in the spoken disambiguation statement.

11. The system of claim 8, wherein a threshold is used to determine near-homophones.

12. The system of claim 8, the computer-readable storage medium having additional instructions stored which result in the operations further comprising:
receiving a confirmation of one of the matches, to yield a confirmed match; and
connecting a caller to the confirmed match.

13. The system of claim 8, wherein information unique to the first meta-data and the second meta-data is customized.

14. The system of claim 8, the computer-readable storage medium having additional instructions stored which result in the operations further comprising:
receiving a request from a user for further disambiguation information; and
presenting the further spoken disambiguation information to the user.

15. A computer-readable storage device having instructions stored which, when executed by a computing device, cause the computing device to perform operations comprising:
receiving a speech query for a name in a directory of names;
retrieving matches to the query, the matches comprising a first match and a second match that are one of homophonic and near-homophonic;
identifying first meta-data that is unique to and associated with the first match and second meta-data that is unique to and associated with the second match; and
identifying, via an analysis of the first meta-data and the second meta-data, a first meta-data component of the first meta-data and a second meta-data component of the second meta-data, wherein the first meta-data component and the second meta-data component have a highest strength of difference between the first meta-data and the second meta-data; and
presenting a spoken disambiguation statement to a user that incorporates the first meta-data component and the second meta-data component.

16. The computer-readable storage device of claim 15, wherein identifying of the first meta-data and the second meta-data comprises identifying multiple pieces of the unique information when necessary to completely disambiguate the matches.

17. The computer-readable storage device of claim 16, wherein a hierarchy establishes priority of multiple pieces of the unique information for use in the spoken disambiguation statement.

18. The computer-readable storage device of claim 15, wherein a threshold is used to determine near-homophones.

19. The computer-readable storage device of claim 15, the computer-readable storage device having additional instructions stored which result in the operations further comprising:
receiving a confirmation of one of the matches, to yield a confirmed match; and
connecting a caller to the confirmed match.

20. The computer-readable storage device of claim 15, the computer-readable storage device having additional instructions stored which result in the operations further comprising:
receiving a request from a user for further disambiguation information; and
presenting the further spoken disambiguation information to the user.

* * * * *